US010210157B2

(12) United States Patent
Dandapat et al.

(10) Patent No.: US 10,210,157 B2
(45) Date of Patent: Feb. 19, 2019

(54) METHOD AND SYSTEM FOR DATA PROCESSING FOR REAL-TIME TEXT ANALYSIS

(71) Applicant: Conduent Business Services, LLC, Dallas, TX (US)

(72) Inventors: Sandipan Dandapat, Kolkata (IN); Ragunathan Mariappan, Chennai (IN); Shourya Roy, Bangalore (IN); Shreshtha Mundra, Indore (IN)

(73) Assignee: Conduent Business Services, LLC, Dallas, TX (US)

( * ) Notice: Subject to any disclaimer, the term of this patent is extended or adjusted under 35 U.S.C. 154(b) by 55 days.

(21) Appl. No.: 15/183,831

(22) Filed: Jun. 16, 2016

(65) Prior Publication Data
US 2017/0364504 A1  Dec. 21, 2017

(51) Int. Cl.
  *H04M 3/51* (2006.01)
  *G06F 17/27* (2006.01)
  *G06F 17/24* (2006.01)

(52) U.S. Cl.
  CPC ......... *G06F 17/279* (2013.01); *G06F 17/241* (2013.01); *G06F 17/2765* (2013.01); *H04M 3/51* (2013.01); *H04M 2203/401* (2013.01)

(58) Field of Classification Search
  CPC . H04M 3/5175; H04M 3/51; H04M 2203/401
  See application file for complete search history.

(56) References Cited

U.S. PATENT DOCUMENTS

| 9,742,915 | B1* | 8/2017 | Daddi | H04M 3/5175 |
| 2007/0071206 | A1* | 3/2007 | Gainsboro | H04M 3/2281 379/168 |
| 2010/0246800 | A1* | 9/2010 | Geppert | G06F 3/04817 379/265.09 |
| 2010/0332287 | A1* | 12/2010 | Gates | G06F 17/277 705/7.32 |

(Continued)

OTHER PUBLICATIONS

Park, "Automatic Call Quality Monitoring Using Cost-Sensitive Classification", Twelfth Annual Conference of the International Speech Communication Association. 2011.*

(Continued)

*Primary Examiner* — Samuel G Neway
(74) *Attorney, Agent, or Firm* — Jones Robb, PLLC

(57) ABSTRACT

The disclosed embodiments illustrate methods data processing for real-time text analysis. The method includes receiving text content from a plurality of user-computing devices, wherein the text content comprises at least a current text segment and a previous text segment. The method further includes extracting one or more first features from the current text segment, wherein at least a first feature of the one or more first features corresponds to a difference between timestamps associated with each of the current text segment and the previous text segment. The method further includes categorizing the current text segment into a predetermined category of one or more predetermined categories, based on at least the one or more first features, automatically by utilizing a classifier. Further, the method includes predicting a likelihood of evolution of an attribute in the text content, based on the predetermined category associated with the current text segment.

20 Claims, 5 Drawing Sheets

(56) References Cited

U.S. PATENT DOCUMENTS

| | | | | |
|---|---|---|---|---|
| 2011/0295591 | A1* | 12/2011 | Fang | G06F 17/2775 704/9 |
| 2014/0140497 | A1* | 5/2014 | Ripa | H04M 3/5133 379/265.06 |
| 2015/0098561 | A1* | 4/2015 | Etison | H04M 3/5175 379/265.06 |
| 2015/0195406 | A1* | 7/2015 | Dwyer | H04M 3/5175 379/265.07 |
| 2015/0201077 | A1* | 7/2015 | Konig | H04M 3/5175 379/265.07 |
| 2015/0256675 | A1* | 9/2015 | Sri | H04M 3/5183 379/265.09 |
| 2016/0098480 | A1* | 4/2016 | Nowson | G06F 17/2785 707/738 |
| 2017/0357636 | A1* | 12/2017 | Shafiulla | H04M 7/0021 |
| 2017/0364504 | A1* | 12/2017 | Dandapat | G06F 17/279 |

OTHER PUBLICATIONS $QA^{RT}$: A System for Real-Time Holistic Quality Assurance for Contact Center Dialogues, Shourya Roy, Ragunathan Mariappan, Sandipan Dandapat, Saurabh Srivastava, Sainyam Galhotra and Balaji Peddamuthu; Xerox Research Centre India, Bangalore, India; Proceedings of the Thirtieth AAAI conference on Artificial Intelligence (AAAI-16); pp. 3769-3775.

Bandhakavi et al., 2014] Bandhakavi, A., Wiratunga, N., P, D., and Massie, S. (2014). Generating a word-emotion lexicon from #emotional tweets. In Proceedings of the Third Joint Conference on Lexical and Computational Semantics (*SEM 2014), pp. 12{21.

Strapparava and Mihalcea, 2008] Strapparava, C. and Mihalcea, R. (2008). Learning to identify emotions in text. In Proceedings of the 2008 ACM symposium on Applied computing, pp. 1556{1560. ACM.

Esuli and Sebastiani, 2006] Esuli, A. and Sebastiani, F. (2006). Sentiwordnet: A publicly available lexical resource for opinion mining. In Proceedings of LREC, vol. 6, pp. 417{422. Citeseer.

Krcadinac et al., 2013] Krcadinac, U., Pasquier, P., Jovanovic, J., and Devedzic, V. (2013). Synesketch: An open source library for sentence-based emotion recognition. Affective Computing, IEEE Transactions on, 4(3):312{325.

[Strapparava et al., 2006] Strapparava, C., Valitutti, A., and Stock, O. (2006). The affective weight of lexicon. In Proceedings of the Fifth International Conference on Language Resources and Evaluation, pp. 423{426.

[Pang et al., 2002] Pang, B., Lee, L., and Vaithyanathan, S. (2002). Thumbs up?: sentiment classification using machine learning techniques. In Proceedings of the ACL-02 conference on Empirical methods in natural language processing—vol. 10, pp. 79{86. Association for Computational Linguistics.

[Ekman and Keltner, 1970] Ekman, P. and Keltner, D. (1970). Universal facial expressions of emotion. California Mental Health Research Digest, 8(4):151{158.

[Aman and Szpakowicz, 2008] Aman, S. and Szpakowicz, S. (2008). Using roget's thesaurus for fine-grained emotion recognition. In IJCNLP, pp. 312{318. Citeseer.

* cited by examiner

METHOD AND SYSTEM FOR DATA PROCESSING FOR REAL-TIME TEXT ANALYSIS

TECHNICAL FIELD

The presently disclosed embodiments are related, in general, to data processing. More particularly, the presently disclosed embodiments are related to methods and systems for data processing for real-time text analysis.

BACKGROUND

Past decade has witnessed a plethora of advancements and various competitive techniques in the field of data and voice communication over wired and wireless networks. Most of the organizations, whether product providers or service providers, focus on building strong customer relationships through various approaches, such as the provision of satisfactory customer care services. Accordingly, a customer care representative or a help-desk agent at a call center or a commercial organization communicates with the customers, or other individuals, to respond to the queries on different products/services, recommend new services/products, or provide technical support on existing services/products, over different communication channels.

The communication between the entities, i.e., the customer and the customer care executive, may be text-based or voice-based conversation. To ensure a high level of customer satisfaction, such conversations are recorded for quality analysis. The recorded conversations are manually reviewed, for categorization, on a periodic basis based on pre-defined criteria, such as addressing to the customer by the agent, correctly thanking the customer for correspondence, using correct grammar, focusing on the subject matter, emotions and the like. Such categorization may allow the organization or the service provider to draw one or more inferences. For example, categorizing the text content (transmitted during an ongoing communication between a customer care representative and a customer) into one or more categories may help to the organization to determine whether the customer is satisfied with the services. However, the manually categorizing the text content while the conversation is taking place may be arduous.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method of data processing for real-time text analysis. The method includes receiving, by one or more transceivers, text content from a plurality of user-computing devices associated with a plurality of users communicating with each other over a communication network, wherein the text content comprises at least a current text segment and a previous text segment. The method further includes extracting, by one or more processors, one or more first features from the current text segment, wherein at least a first feature of the one or more first features corresponds to a difference between timestamps associated with each of the current text segment and the previous text segment. The method further includes categorizing, by the one or more processors, the current text segment into a predetermined category of one or more predetermined categories, based on at least the one or more first features, automatically by utilizing a classifier, wherein the classifier is trained based on at least the one or more first features extracted from annotated one or more historical text segments in historical text content, wherein the predetermined category is associated with an attribute of one or more attributes. Further, the method includes predicting, by the one or more processors, a likelihood of evolution of the attribute in the text content, based on the predetermined category associated with the current text segment, wherein the predicted likelihood is presented as a graphical item on a display screen.

According to embodiments illustrated herein, there is provided a system for data processing for real-time text analysis. The system includes one or more processors configured to receive text content, by utilizing one or more transceivers, from a plurality of user-computing devices associated with a plurality of users communicating with each other over a communication network, wherein the text content comprises at least a current text segment and a previous text segment. The system includes one or more processors further configured to extract one or more first features from the current text segment, wherein at least a first feature of the one or more first features corresponds to a difference between timestamps associated with each of the current text segment and the previous text segment. The system includes one or more processors further configured to categorize the current text segment into a predetermined category of one or more predetermined categories, based on at least the one or more first features, automatically by utilizing a classifier, wherein the classifier is trained based on at least the one or more first features extracted from annotated one or more historical text segments in historical text content, wherein the predetermined category is associated with an attribute of one or more attributes. The system includes one or more processors further configured to predict a likelihood of evolution of the attribute in the text content, based on the predetermined category associated with the current text segment, wherein the predicted likelihood is presented as a graphical item on a display screen.

According to embodiments illustrated herein, there is provided a computer program product for use with a computing device. The computer program product comprises a non-transitory computer readable medium storing a computer program code for data processing for real-time text analysis. The computer program code is executable by one or more processors to receive text content, by utilizing one or more transceivers, from a plurality of user-computing devices associated with a plurality of users communicating with each other over a communication network, wherein the text content comprises at least a current text segment and a previous text segment. The computer program code is further executable by one or more processors to extract one or more first features from the current text segment, wherein at least a first feature of the one or more first features corresponds to a difference between timestamps associated with each of the current text segment and the previous text segment. The computer program code is further executable by one or more processors to categorize the current text segment into a predetermined category from one or more predetermined categories, based on at least the one or more first features, automatically by utilizing a classifier, wherein the classifier is trained based on at least the one or more first features extracted from annotated one or more historical text segments in historical text content, wherein the predetermined category is associated with an attribute of one or more attributes. The computer program code is further executable by one or more processors to predict a likelihood of evolution of the attribute in the text content, based on the predetermined category associated with the current text segment, wherein the predicted likelihood is presented as a graphical item on a display screen.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
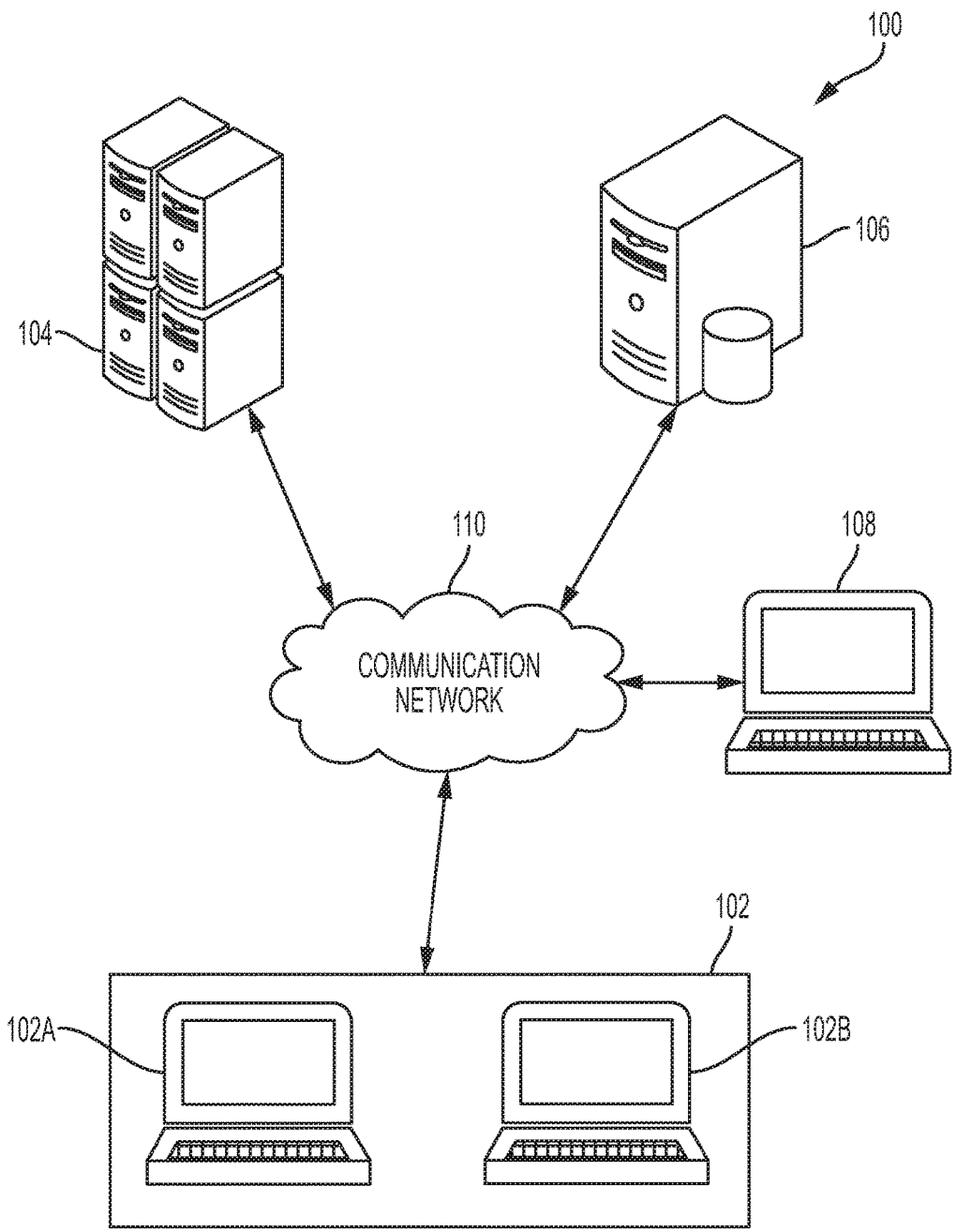
FIG. 1 is a block diagram that illustrates a system environment in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions

The following terms shall have, for the purposes of this application, the meanings set forth below.

A "user-computing device" refers to a computer, a device (that includes one or more processors/microcontrollers and/or any other electronic components), or a system (that performs one or more operations according to one or more programming instructions/codes) associated with a user. In an embodiment, the user may utilize the user-computing device to communicate with another user. Examples of the user-computing device may include, but are not limited to, a desktop computer, a laptop, a personal digital assistant (PDA), a mobile device, a smartphone, and a tablet computer (e.g., iPad® and Samsung Galaxy Tab®).

A "requester-computing device" refers to a computer, a device (that includes one or more processors/microcontrollers and/or any other electronic components), or a system (that performs one or more operations according to one or more programming instructions/codes) associated with a requestor, such as a service provider. In an embodiment, the requestor may utilize the requester-computing device to transmit a request, such as a request for text analysis. Examples of the requestor-computing device may include, but are not limited to, a desktop computer, a laptop, a PDA, a mobile device, a smartphone, and a tablet computer (e.g., iPad® and Samsung Galaxy Tab®).

"Communication" refers to one or more dialogues exchanged between at least two users of a plurality of users. For example, a first user, in the plurality of users, may correspond to an agent (in a customer care environment), and a second user, in the plurality of users, may correspond to a customer. In accordance with an embodiment, the communication may correspond to a text-based conversation between the plurality of users over a communication network. In an embodiment, the communication may further correspond to a speech-based conversation.

"Emotion" refers to an opinion, a mood, or a view of a user towards a product, a service, or another entity. In an embodiment, the emotion may be representative of a feeling, an attitude, a belief, and/or the like. In an embodiment, the emotion may be associated with an emotion type, such as happiness, assurance, apology, courtesy, agreement, unhappiness, disagreement and/or other feelings of the user.

"Text content" refers to information that is in text format. In an embodiment, when a plurality of users communicate with each other by exchanging a plurality of text messages, the plurality of text messages may correspond to the text content. In an embodiment, the text content may be generated by conversion of a speech conversation into the text format by means of one or more speech-to-text conversion techniques.

"One or more text segments" refer to one or more homogeneous sentences in text content. In an embodiment, the text content may be parsed or segmented into one or more text segments by use of one or more sentence segmentation techniques, such as a sentence boundary detection algorithm. In an embodiment, each of the one or more text segments may correspond to a fused turn segment that is representative of a homogenous attribute.

A "current text segment" refers to a text segment in text content that is processed for text analysis. In an embodiment, a timestamp may be associated with the current text segment, such that the timestamp represents the time instance at which the current text segment was transmitted during ongoing communication between at least two of a plurality of users.

A "previous text segment" refers to a text segment in text content that is temporally adjacent and prior to a current text segment in the text content. In an embodiment, the previous text segment is associated with a predetermined category. Further, the predetermined category associated with the previous text segment may be utilized to detect a predetermined category of one or more predetermined categories for the current text segment.

"One or more keywords" refer to one or more words present in a text segment. For example, in a text segment, such as "Hi there, How are you?," the one or more keywords are "Hi," "there," "How," "are," and "you." In an embodiment, one or more stop words, such as interjections, conjunctions, prepositions, pronouns, and/or the like, in the text segment may not be considered as the one more keywords. For example, in the text segment, such as "Hi there, How are you?," the one or more keywords are "Hi," "there," and "How."

"One or more graphical icons" refer to one or more items, such as emoticons and/or graphical characters, in a text segment. For example, in a text segment, such as "Hi there! ☺," the graphical character "☺" may correspond to a graphical icon. In an embodiment, the one or more graphical icons may be used in a text-based conversation between a plurality of users. Further, the one or more graphical icons may be associated with an attribute, such as an emotion type. For example, a graphical icon, such as "☺," may be associated with an attribute (i.e., a positive emotion type), such as "happiness," "assurance," "satisfaction," and/or the like. Similarly, a graphical icon, such as "☹," may be associated with another attribute (i.e., a negative emotion type), such as "disagreement," "dissatisfaction," "unhappiness," and/or the like.

"One or more positive keywords and/or graphical icons" refer to one or more keywords and/or graphical icons in a text segment that are associated with a pre-specified label, such as "positive" (i.e., indicative of a positive attribute, such as "happiness," "assurance," "satisfaction," and/or the like). For example, in a text segment, such as "I am proud of you ☺," a keyword, such as "proud," and a graphical icon, such as "☺," may be associated with the pre-specified label "positive" and are indicative of a positive attribute associated with the text segment.

"One or more negative keywords and/or graphical icons" refer to one or more keywords and/or graphical icons in a text segment that are associated with a pre-specified label, such as "negative" (i.e., indicative of a negative attribute, such as "unhappiness," "disagreement," "dissatisfaction," and/or the like). For example, in a text segment, such as "I am disappointed at you ☹," a keyword, such as "disappointed," and a graphical icon, such as "☹," may be associated with the pre-specified label "negative" and are indicative of a negative attribute associated with the text segment.

"Association parameter" refers to a score that is indicative of an extent to which a keyword and/or graphical icon may be associated with a pre-specified label of one or more pre-specified labels. In an embodiment, strength of the association parameter represents the extent of association between the keyword and/or graphical icon and the pre-specified label. For example, the strength of the association parameter for a keyword, such as "delighted," and a pre-specified label, such as "unhappiness," may be very low. However, the strength of the association parameter for the keyword, such as "delighted," and a pre-specified label, such as "happiness," may be very high.

A "set of labeled keywords and/or graphical icons" refers to a group of keywords and/or graphical icons that are tagged for one or more pre-specified labels, such as "positive," "negative," "happiness," "sadness," and/or the like. In an embodiment, the labeling/tagging of keywords and/or graphical icons is based on one or more characteristics, such as semantic characteristics, syntactic characteristics, emotional characteristics, domain characteristics and/or the like, that are associated with the keywords and/or graphical icons.

"One or more crowd-workers" refer to a worker or a group of workers that may perform one or more tasks, such as annotating each of one or more historical text segments with a pre-specified label of one or pre-specified labels that generate data that contribute to a defined result.

"One or more first features" refer to one or more parameters extracted from each of one or more text segments in text content. In an embodiment, the one or more first features may be utilized to detect a predetermined category associated with the one or more text segments. In an embodiment, the one or more first features associated with a current text segment in the one or more text segments may correspond to a difference between timestamps associated with each of the current text segment and a previous text segment, information pertaining to a position of the current text segment in the text content, a count of one or more keywords in the current text segment, and a predetermined category associated with the previous text segment.

"One or more second features" refers to one or more parameters extracted from each of one or more text segments in text content. In an embodiment, the one or more second features may be utilized to detect a predetermined category associated with the one or more text segments. In an embodiment, the one or more second features associated with a current text segment in the one or more text segments may correspond to one or more keywords, in the current text segment, with a frequency of occurrence greater than a first pre-specified threshold and a count of one or more positive and/or negative keywords and/or graphical icons in the current text segment.

"One or more predetermined categories" refer to one or more categories into which a text segment may be classified. In an embodiment, a predetermined category of the one or more predetermined categories is associated with an attribute of one or more attributes. In an embodiment, one or more first features and one or more second features may be extracted from the text segment. Further, based on the one or more first features and the one or more second features an attribute associated with the text segment may be detected by a trained classifier. Further, the text segment may be categorized into the predetermined category that is associated with the detected attribute.

An "attribute" of one or more attributes refers to a characteristic associated with a predetermined category of one or more predetermined categories. In an embodiment, the attribute may correspond to an emotion type associated with a text segment. For example, an attribute (i.e., an emotion type, such as "happiness") may be associated with a first predetermined category, such as "happy," and another attribute (i.e., another emotion type, such as "unhappiness") may be associated with a second predetermined category, such as "unhappy." In an embodiment, based on an attribute detected for a text segment, the text segment may be categorized in the predetermined category associated with the detected attribute.

A "classifier" refers to a statistical model that may be configured to categorize one or more text segments into one or more predetermined categories. In an embodiment, the classifier may be trained based on historical data. In an embodiment, the trained classifier may detect an attribute associated with a text segment. Further, based on the detected attribute, the trained classifier may categorize the text segment into the corresponding predetermined category. Examples of one or more techniques that may be utilized to train the classifier may include, but are not limited to, Support Vector Machine (SVM), a Logistic Regression, a Conditional Random Field (CRF) model, a Bayesian Classifier, a Decision Tree Classifier, a K-Nearest Neighbors (KNN) Classifier, and/or the like.

"Evolution" refers to growth of an attribute during communication between a plurality of users. In an embodiment, the communication may be a text-based conversation and/or a speech-based conversation. In an embodiment, the evolution of the attribute in text content may be predicted based on a determined likelihood of an association of the attribute with one or more text segments in the text content. Further, the prediction of the evolution of the attribute during the conversation may be utilized to analyze the course of the conversation. For example, if during a conversation between a customer care representative and a customer in a call center environment, an attribute (i.e., an emotion type), such as "happiness," "assurance," "satisfaction," and/or the like, has a positive growth, this growth may indicate that a good experience for the customer, whereas a positive growth of the attribute, such as "unhappiness," "disagreement," and/or the like, may indicate a bad experience for the customer.

"Historical text content" refers to text content that may be utilized to train a classifier. In an embodiment, the historical text content may correspond to text content associated with prior communication between a plurality of users. In an embodiment, the historical text content comprises one or more historical text segments.

"Annotated one or more historical text segments" refer to text segments in historical text content that are tagged/labeled based on an association of the text segments with one or more predetermined categories. In an embodiment, one or more crowd-workers may annotate the one or more historical text segments. In an embodiment, the annotated one or more historical text segments may be utilized for training a classifier to categorize one or more text segments that are not associated with the one or more predetermined categories.

FIG. 1 is a block diagram of a system environment in which various embodiments may be implemented. With reference to FIG. 1, there is shown a system environment 100 that includes a plurality of user-computing devices 102, such as user-computing devices 102A and 102B, an application server 104, a database server 106, a requestor-computing device 108, and a communication network 110. Various devices in the system environment 100 may be interconnected over the communication network 110. FIG. 1 shows, for simplicity, two user-computing devices, such as the user-computing devices 102A and 102B, among the plurality of user-computing devices 102, one application server, such as the application server 104, one database server, such as the database server 106, and one requestor-computing device, such as the requestor-computing device 108. However, it will be apparent to a person having ordinary skill in the art that the disclosed embodiments may also be implemented using more than two user-computing devices in the plurality of user-computing devices, multiple application servers, multiple database servers, and multiple requestor-computing devices, without departing from the scope of the disclosure.

The plurality of user-computing devices 102 refers to computing devices, each of which comprises one or more processors and one or more memories. The one or more memories may include computer readable codes, instructions, or programs that are executable by the one or more processors to perform one or more first predetermined operations. Each of the plurality of user-computing devices 102 (associated with a corresponding user) may be communicatively coupled to the communication network 110. In an embodiment, the one or more first predetermined operations may include transmission of text content, over the communication network 110. In an embodiment, each of the plurality of user-computing devices 102 may include one or more installed applications or software programs, which may be utilized by the corresponding user to perform the one or more first predetermined operations.

Each of the plurality of user-computing devices 102 may correspond to a variety of computing devices such as, but not limited to, a laptop, a PDA, a tablet computer, a smartphone, and a phablet.

In an embodiment, the application server 104 may refer to a computing device or a software framework hosting an application or a software service that may be communicatively coupled to the communication network 110. In an embodiment, the application server 104 may be implemented to execute procedures, such as, but not limited to, programs, routines, or scripts stored in one or more memories for supporting the hosted application or the software service. In an embodiment, the hosted application or the software service may be configured to perform one or more second predetermined operations. In an embodiment, the one or more second predetermined operations may include real-time text analysis based on a request received from the requestor-computing device 108. Based on the received request, the application server 104 may be configured to receive the text content from the plurality of user-computing devices 102 associated with the plurality of users communicating with each other over the communication network 110. In an embodiment, the application server 104 may be configured to segment the text content, received from the plurality of user-computing devices 102, into one or more text segments. In an embodiment, each of the one or more text segments may correspond to a fused turn segment that is indicative of a homogenous attribute. In an embodiment, the application server 104 may utilize one or more sentence segmentation algorithms, such as sentence boundary detection algorithm, known in the art for the segmentation of the text content. In an embodiment, the one or more text segments may comprise at least a current text segment and a previous text segment that is temporally adjacent and prior to the current text segment.

In an embodiment, the application server 104 may be configured to extract one or more first features and one or more second features from each of the one or more text segments, such as the current text segment. In an embodiment, the one or more first features associated with the current text segment in the one or more text segments may correspond to a difference between timestamps associated with each of the current text segment and the previous text segment, information pertaining to a position of the current text segment in the text content, a count of one or more keywords in the current text segment, and a predetermined category associated with the previous text segment. In an embodiment, the one or more second features, associated with the current text segment may correspond to one or more keywords, in the current text segment, with a frequency of occurrence greater than a first pre-specified threshold and a count of one or more positive and/or negative keywords and/or graphical icons in the current text segment.

In an embodiment, the application server 104 may be further configured to categorize each of the one or more segments, in the text content, into one or more predetermined categories. In an embodiment, a predetermined category of the one or more predetermined categories is associated with an attribute of one or more attributes. In an embodiment, an attribute of the one or more attributes may correspond to an emotion type. In an embodiment, the application server 104 may utilize the extracted one or more first features and the extracted one or more second features for the detection of an attribute, of the one or more attributes, that is associated with a text segment, such as the current text segment, in the one or more text segments. The application server 104 may utilize a trained classifier for the detection of the attribute. Thereafter, the trained classifier may categorize the text segment, such as the current text segment, into a predetermined category that is associated with the detected attribute.

Prior to the categorization, in an embodiment, the application server 104 may be further configured to train the classifier. In an embodiment, the application server 104 may utilize historical text content for training the classifier. The historical text content may further comprise one or more historical text segments. In an embodiment, the application server 104 may query the database server 106 to retrieve the historical text content. In another embodiment, the application server 104 may retrieve the historical text content from a content repository of a service agency, such as a call center. An embodiment of the method to train the classifier for real-time text analysis has been explained later in FIG. 4.

In an embodiment, the application server 104 may be further configured to predict a likelihood of evolution of the attribute in the text content. In an embodiment, the application server 104 may utilize the predetermined category associated with each of the one or more text segments for the prediction of the likelihood of evolution of the attribute in the text content. In an embodiment, the application server 104 may be configured to present the predicted likelihood as a graphical item on a display screen of the requestor-computing device 108 associated with a service provider.

The application server 104 may be realized through various types of application servers, such as, but not limited to, a Java application server, a .NET framework application server, a Base4 application server, a PHP framework application server, or any other application server framework. An embodiment of the structure of the application server 104 has been discussed later in FIG. 2.

In an embodiment, the database server 106 may refer to a computing device that may be communicatively coupled to the communication network 110. In an embodiment, the database server 106 may be configured to store the historical text content. In an embodiment, the historical text content may comprise the one or more historical text segments. In an embodiment, the service provider may store the historical text content in the database server 106. In an embodiment, the database server 106 may be further configured to store annotated historical text content received from the application server 104.

In an embodiment, the database server 106 may be further configured to store a set of labeled keywords and/or graphical icons. In an embodiment, each keyword and/or graphical icon in the set of labeled keywords and/or graphical icons may be associated with a pre-specified label among the one or more pre-specified labels. For example, each keyword and/or graphical icon in the set of labeled keywords and/or graphical icons may be associated with a pre-specified label in the one or more pre-specified labels, such as "positive" and "negative." In an embodiment, the pre-specified label "positive" may correspond to a positive attribute (i.e., a positive emotion type), such as "happiness," "courtesy," "agreement," "apology," "satisfaction," and/or the like. Further, the pre-specified label "negative" may correspond to a negative attribute (i.e., a negative emotion type), such as "disagreement," "unhappy," and or the like.

In an embodiment, the set of labeled keywords and/or graphical icons may be stored in the database server 106 by the service provider. In an embodiment, the service provider may have extracted the set of labeled keywords and/or graphical icons from the one or more websites.

A person having ordinary skill in the art will understand that the abovementioned example of the one or more pre-specified labels is for illustrative purpose and should not be construed to limit the scope of the disclosure. In another embodiment, the one or more pre-specified labels may comprise the pre-specified labels other than "positive" and "negative."

In an embodiment, the database server 106 may be further configured to receive a query from the application server 104 to retrieve the historical text content and/or the set of labeled keywords and/or graphical icons. For querying the database server 106, one or more querying languages may be utilized, such as, but not limited to, SQL, QUEL, and DMX. Further, the database server 106 may be realized through various technologies, such as, but not limited to, Microsoft® SQL server, Oracle, and My SQL. In an embodiment, the database server 106 may connect to the application server 104, using one or more protocols, such as, but not limited to, ODBC protocol and JDBC protocol.

A person having ordinary skill in the art will appreciate that the scope of the disclosure is not limited to realizing the application server 104 and the database server 106 as separate entities. In an embodiment, the functionalities of the application server 104 can be integrated into the database server 106, without any deviation from the scope of the disclosure.

In an embodiment, the requestor-computing device 108 may refer to a computing device (associated with the service provider) that may be communicatively coupled with the communication network 110. The requestor-computing device 108 may include one or more processors and one or more memories. The one or more memories may include computer readable codes, instructions, or programs that are executable by the one or more processors to perform one or more specific operations. The one or more specific operations may include the transmission of the request, by the service provider, for real-time text analysis. In an embodiment, the requestor-computing device 108 may include one or more installed applications or software programs, which may be utilized by the service provider to perform the one or more specific operations.

The requestor-computing device 108 may correspond to a variety of computing devices such as, but not limited to, a laptop, a PDA, a tablet computer, a smartphone, and a phablet.

The communication network 110 corresponds to a medium through which content and messages flow between various devices of the system environment 100 (e.g., the plurality of user-computing devices 102, the application server 104, the database server 106, and the requestor-computing device 108). Examples of the communication network 110 may include, but are not limited to, a Wireless Fidelity (Wi-Fi) network, a Wireless Area Network (WAN), a Local Area Network (LAN), or a Metropolitan Area Network (MAN). The various devices in the system environment 100 can connect to the communication network 110 in accordance with various wired and wireless communication protocols such as Transmission Control Protocol and Internet Protocol (TCP/IP), User Datagram Protocol (UDP), and 2G, 3G, or 4G communication protocols.

Figure 2:
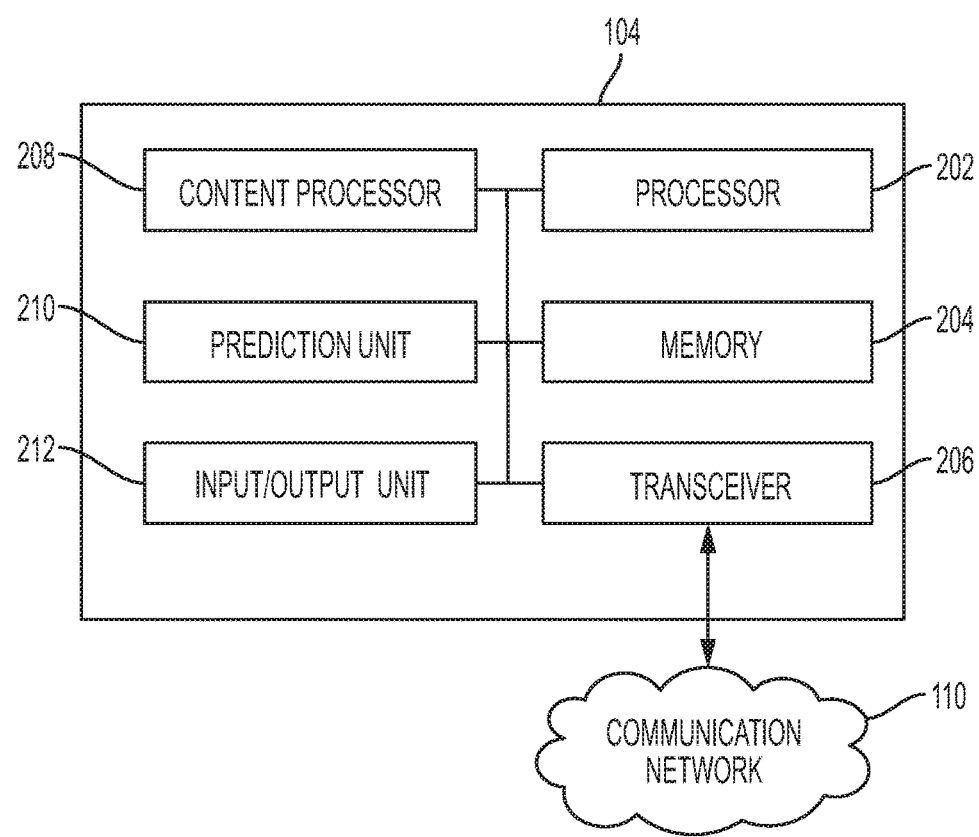
FIG. 2 is a block diagram that illustrates an application server, in accordance with at least one embodiment.

FIG. 2 is a block diagram that illustrates an application server, in accordance with at least one embodiment. FIG. 2 has been described in conjunction with FIG. 1. With reference to FIG. 2, there is shown a block diagram of the application server 104 that may include a processor 202, a memory 204, a transceiver 206, a content processor 208, a prediction unit 210, and an input/output unit 212. The processor 202 is communicatively coupled to the memory 204, the transceiver 206, the content processor 208, the prediction unit 210, and the input/output unit 212.

The processor 202 includes suitable logic, circuitry, and/or interfaces that are configured to execute one or more instructions stored in the memory 204. The processor 202 may further comprise an arithmetic logic unit (ALU) (not shown) and a control unit (not shown). The ALU may be coupled to the control unit. The ALU may be configured to perform one or more mathematical and logical operations and the control unit may control the operations of the ALU. The processor 202 may execute a set of instructions/programs/codes/scripts stored in the memory 204 to perform one or more operations for the real-time text analysis. Examples of the one or more operations may include training the classifier based on the one or more first features and the one or more second features associated with the historical text content. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions that are executable by the processor 202, the transceiver 206, the content processor 208, the prediction unit 210, and the input/output unit 212. In an embodiment, the memory 204 may include one or more buffers (not shown). The one or more buffers may store the one or more text segments. The one or more buffers may further store the one or more first features and the one or more second features extracted from each of the one or more text segments. Examples of some of the commonly known memory implementations may include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more instructions stored in the memory 204 may enable the hardware of the application server 104 to perform the one or more second predetermined operations, without deviating from the scope of the disclosure.

The transceiver 206 transmits/receives messages and data to/from various components, such as the plurality of user-computing devices 102, the database server 106, and the requestor-computing device 108 of the system environment 100, over the communication network 110. In an embodiment, the transceiver 206 may be communicatively coupled to the communication network 110. In an embodiment, the transceiver 206 may be configured to receive the request for real-time text analysis from the requestor-computing device 108. Further based on the received request, the transceiver 206 may be configured to receive the text content from the plurality of user-computing devices 102 associated with a plurality of users communicating with each other, over the communication network 110. In an embodiment, the transceiver 206 may be configured to transmit the likelihood of evolution of the attribute, as the graphical item, to the requestor-computing device 108 associated with the service provider. Examples of the transceiver 206 may include, but are not limited to, an antenna, an Ethernet port, a USB port, or any other port that can be configured to receive and transmit data. The transceiver 206 receives and transmits the content/information/notifications, in accordance with the various communication protocols, such as TCP/IP, UDP, and 2G, 3G, or 4G communication protocols.

The content processor 208 includes suitable logic, circuitry, and/or interfaces that are configured to execute the one or more sets of instructions stored in the memory 204. In an embodiment, the content processor 208 may be configured to segment the text content into the one or more text segments. The content processor 208 may utilize the one or more sentence segmentation algorithms, such as sentence boundary detection algorithm, known in the art for the segmentation of the text content. In an embodiment, the content processor 208 may be further configured to perform one or more operations for extracting the one or more first features and the one or more second features from each of the one or more text segments. The content processor 208 may be implemented based on a number of processor technologies known in the art. Examples of the content processor 208 include, but are not limited to, a word processor, an X86-based processor, a RISC processor, an ASIC processor, and/or a CISC processor.

A person having ordinary skill in the art will appreciate that the scope of the disclosure is not limited to realizing the content processor 208 and the processor 202 as separate entities. In an embodiment, the content processor 208 may be implemented within the processor 202, without departing from the spirit of the disclosure. Further, a person skilled in the art will understand that the scope of the disclosure is not limited to realizing the content processor 208 as a hardware component. In an embodiment, the content processor 208 may be implemented as a software module included in computer program code (stored in the memory 204), which may be executable by the processor 202 to perform the functionalities of the content processor 208, without deviating from the scope of the disclosure.

The prediction unit 210 includes suitable logic, circuitry, and/or interfaces that may be configured to execute the one or more sets of instructions stored in the memory 204. In an embodiment, the prediction unit 210 may be configured to predict the likelihood of the evolution of the attribute in the text content. The prediction unit 210 may utilize the detected attribute associated with each of the one or more text segments in the text content for the prediction of the likelihood of evolution of the attribute. In an embodiment, the prediction unit 210 may be implemented as an ASIC microchip designed for a special application, such as to predict the likelihood of evolution of the attribute in the text content.

A person having ordinary skill in the art will understand that the scope of the disclosure is not limited to realizing the prediction unit 210 and the processor 202 as separate entities. In an embodiment, the prediction unit 210 may be implemented within the processor 202, without departing from the scope of the disclosure.

The input/output unit 212 may comprise suitable logic, circuitry, interfaces, and/or code that may be configured to provide an output to the user and/or the service provider. The input/output unit 212 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker. The working of the application server 104 for emotion detection has been explained later in FIG. 3 and FIG. 4.

Figure 3:
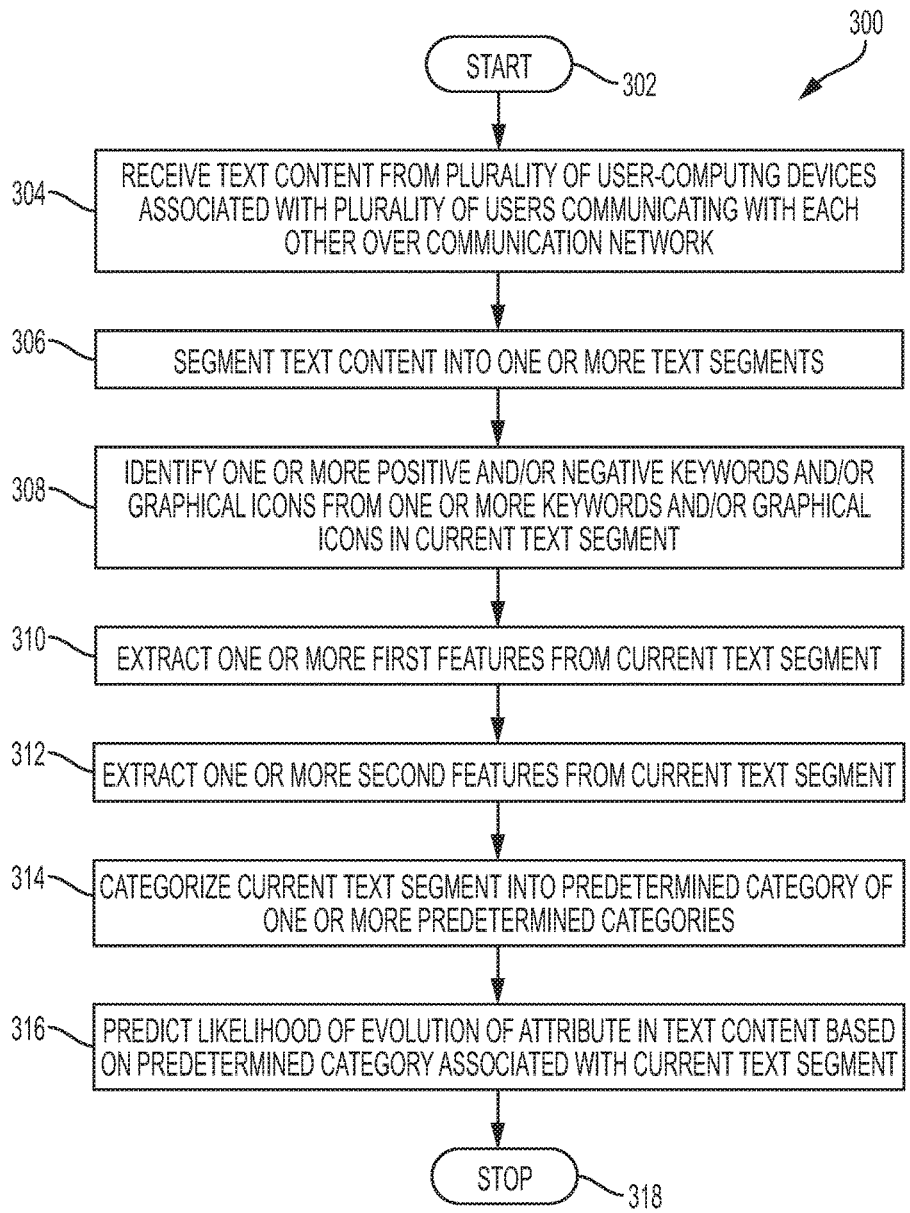
FIG. 3 is a flowchart that illustrates a method of data processing for real-time text analysis by utilizing a trained classifier, in accordance with at least one embodiment.

FIG. 3 depicts a flowchart that illustrates a method for real-time text analysis by utilizing a trained classifier, in accordance with at least one embodiment. FIG. 3 is described in conjunction with FIG. 1 and FIG. 2. With reference to FIG. 3, there is shown a flowchart 300 that illustrates a method for real-time text analysis by utilizing the trained classifier. A person having ordinary skill in the art will understand that the examples, as described in FIG. 3, are for illustrative purpose and should not be construed to limit the scope of the disclosure. The method starts at step 302 and proceeds to step 304.

At step 304, the text content is received from the plurality of the user-computing devices 102 associated with the plurality of the users communicating with each other, over the communication network 110. In an embodiment, the transceiver 206, in conjunction with the processor 202, may be configured to receive the text content from the plurality of the user-computing devices 102 associated with the plurality of the users communicating with each other, over the communication network 110. In another embodiment, the transceiver 206 may receive a speech-based conversation, of the plurality of users, from the plurality of the user-computing devices 102. In this scenario, the processor 202 may be configured to convert the speech-based conversation into the text content. The processor 202 may utilize one or more speech-to-text conversion techniques known in the art for the conversion of the speech-based conversation into the text content.

Prior to the reception of the text content, the transceiver 206 may be configured to receive the request, for real-time text analysis, provided by the service provider by utilizing the requestor-computing device 108. In an embodiment, the request may comprise an identification of two or more user-computing devices, such as the plurality of user-computing devices 102, from which the text content is to be received for real-time text analysis. Thereafter, based on the identification of the received request, the transceiver 206 may be configured to receive the text content from the plurality of user-computing devices 102.

In an exemplary scenario, the service provider may correspond to a call center operator, who may be interested in analyzing an ongoing communication between a customer care agent and a customer. Therefore, the service provider may utilize the requestor-computing device 108 to transmit the request to the application server 104 for real-time text analysis of ongoing communication between the customer care agent and the customer. Further, based on the received request, the transceiver 206 may be configured to receive the text content from the plurality of user-computing devices 102 associated with the customer care agent and the customer.

A person having ordinary skill in the art will understand that the abovementioned exemplary scenario is for illustrative purpose and should not be construed to limit the scope of the disclosure.

In an embodiment, the received text content may comprise a plurality of text messages that are exchanged between the plurality of users during the communication. For example, the transceiver 206 may receive the text content, such as:

"User_1: Hi there, thanks for contacting Helpcare. My name is User_1. How can I help you?

User_2: I want to inquire the status of my refund request and have been trying to contact somebody from Helpcare for 2 hours."

In this scenario, "User_1" and "User_2" are communicating with each other by utilizing the plurality of user-computing devices 102, over the communication network 110. Further, the text content comprises two text messages, such as "Hi there, thanks for contacting Helpcare. My name is User_1. How can I help you?" and "I want to inquire the status of my refund request and have been trying to contact somebody from Helpcare for 2 hours," that are exchanged between the "User_1" and the "User_2."

In an embodiment, a text message, of the plurality of text messages in the text content, may be associated with a user identification of the user, who transmitted the text message. For example, the text message, such as "Hi there, thanks for contacting Helpcare. My name is User_1. How can I help you?," is associated with the user identification, such as "User_1."

In an embodiment, a text message, of the plurality of text messages in the text content, may be associated with a timestamp at which the text message was transmitted by the corresponding user. For example, the text message, such as "Hi there, thanks for contacting Helpcare. My name is User_1. How can I help you?," is associated with the timestamp "10:00 AM." Similarly, the text message, such as "I want to inquire the status of my refund request and have been trying to contact somebody from Helpcare for 2 hours," is associated with the timestamp "10:02 AM."

A person having ordinary skill in the art will understand that the abovementioned example is for illustrative purpose and should not be construed to limit the scope of the disclosure.

At step 306, the text content is segmented into the one or more text segments. In an embodiment, the content processor 208, in conjunction with the processor 202, may be configured to segment the text content into the one or more text segments. The content processor 208 may utilize the one or more sentence segmentation algorithms, such as sentence boundary detection algorithm, known in the art for the segmentation of the text content. In an embodiment, the one or more text segments may comprise at least the current text segment and the previous text segment. Further, a text segment in the one or more text segments may be associated with the timestamp of the corresponding text message.

For example, the content processor 208 may segment the text content, such as "User_1: Hi there, thanks for contacting Helpcare. My name is User_1. How can I help you? User_2: I want to inquire the status of my refund request and have been trying to contact somebody from Helpcare for 2 hours," into the one or more text segments by utilizing the sentence boundary detection algorithm. The one or more text segments may be "Hi there," "thanks for contacting Helpcare," "My name is User_1," "How can I help you?," "I want to inquire the status of my refund request," and "have been trying to contact somebody from Helpcare for 2 hours."

A person having ordinary skill in the art will understand that the abovementioned example is for illustrative purpose and should not be construed to limit the scope of the disclosure.

In an embodiment, the processor 202 may be configured to assign a first tag to each of the one or more text segments based on the user, who transmitted the corresponding text segment. For example, the processor 202 may assign the first tag, such as "User_1" to the text segment, such as "thanks for contacting Helpcare." Similarly, the processor 202 may assign the first tag, such as "User_2" to the text segment, such as "I want to inquire the status of my refund request."

In an embodiment, the content processor 208 may be further configured to cluster the one or more text segments into a plurality of statement categories. Examples of the plurality of statement categories may include, but are not limited to, a general statement (GS) category, a query statement (QS) category, a problem statement (PS) category, and a response statement (RS) category. In an embodiment, the content processor 208 may utilize one or more natural language processing (NLP) algorithms known in the art for the clustering of the one or more text segments. Examples of the one or more NLP algorithms may include, but are not limited to, N-gram algorithm, Bayesian networks, and hidden markov model (HMM). For example, the content processor 208 may cluster the text segment, such as "How can I help you?," into the QS category. Similarly, the content processor 208 may categorize the text segment, such as "I want to inquire the status of my refund request," into the PS category.

After clustering, the content processor 208 may be configured to assign a second tag to each of the clustered one or more text segments based on the corresponding statement category of each of the clustered one or more text segments. For example, the content processor 208 may assign the second tag, such as "QS," to the text segment, such as "How can I help you?," in the QS category. Similarly, the content processor 208 may assign the second tag, such as "PS," to the text segment, such as "I want to inquire the status of my refund request," in the PS category.

In an embodiment, the content processor 208 may be configured to identify a count of the one or more text segments that comprises keywords, such as "but," "too," "although," "nevertheless," and or the like.

A person having ordinary skill in the art will understand that for brevity steps 308 to 314 of the flowchart 300 are explained with respect to the current text segment and the previous text segment in the one or more text segments. Notwithstanding, the disclosure may not be so limited, and steps 308 to 314 of the flowchart 300 may be further applicable to each of the one or more text segments of the text content, without deviating from the scope of the disclosure.

At step 308, the one or more positive and/or negative keywords and/or graphical icons are identified from the one or more keywords and/or graphical icons in the current text segment. The one or more positive and/or negative keywords and/or graphical icons are identified from the one or more keywords and/or graphical icons, based on the set of labeled keywords and/or graphical icons. In an embodiment, the content processor 208, in conjunction with the processor 202, may be configured to identify the one or more positive and/or negative keywords and/or graphical icons from the one or more keywords and/or graphical icons in the current text segment, based on the set of labeled keywords and/or graphical icons.

For the identification of the one or more positive and/or negative keywords and/or graphical icons, the transceiver 206 may be configured to query the database server 106 for the retrieval of the set of labeled keywords and/or graphical icons. In an embodiment, each keyword and/or graphical icon in the set of labeled keywords and/or graphical icons may be associated with one pre-specified label in the one or more pre-specified labels, such as "positive" and "negative". Table 1 illustrates a set of labeled keywords and/or graphical icons retrieved from the database server 106.

TABLE 1

Illustration of a set of labeled keywords and/or graphical icons

| Keyword/Graphical icon | Pre-specified label |
| --- | --- |
| Hello | Positive |
| Horrible | Negative |
| Query | Positive |
| Welcome | Positive |
| ☺ | Positive |
| ☹ | Negative |
| Upset | Negative |
| Query | Negative |
| Query | Positive |

A person having ordinary skill in the art will understand that the scope of the disclosure is not limited to the pre-specified labels as "positive" and "negative." In another embodiment, the pre-specified labels may be "happiness," "assurance," "apology," "courteous," "unhappy," "agreement," "disagreement," and "no emotion." Table 2 illustrates a set of labeled keywords and/or graphical icons, labeled with the pre-specified labels, such as "happiness," "assurance," "apology," "courteous," "unhappy," "agreement," "disagreement," and "no emotion," that are retrieved from the database server 106.

TABLE 2

Illustration of another set of labeled keywords and/or graphical icons

| Keyword/Graphical icon | Pre-specified label |
| --- | --- |
| Hello | Courteous |
| Horrible | Unhappy |
| Query | No emotion |
| Welcome | Happy |
| ☺ | Happy |
| ☹ | Unhappy |
| Upset | Disagreement |
| Sure | Agreement |
| Sorry | Apology |
| Certainly | Assurance |

With reference to Table 2, the pre-specified labels may be further associated with "positive" and "negative" labels, such as happiness," "assurance," "apology," "courteous," "agreement," and "No emotion" may be associated with "positive" label and "unhappy" and "disagreement" may be associated with "negative" label.

After the retrieval of the set of labeled keywords and/or graphical icons, the content processor 208 may be configured to determine the strength of an association parameter for each of the labeled keyword and/or graphical icon in the set of labeled keywords and/or graphical icons. In an embodiment, the content processor 208 may determine the strength of the association parameter based on the association of each labeled keyword and/or graphical icon in the set of labeled keywords and/or graphical icons with the corresponding pre-specified label. The content processor 208 may utilize equation 1 and equation 2, known in the art, as shown below for the determination of the strength of the association parameter:

$$AP(w, l) = f(w, l) - f(w, \neg l) \quad (1)$$

$$f(w, l) = \log \frac{freq(w, l)}{freq(w) \times freq(l)} \quad (2)$$

where, freq(w, l) represents a number of times a keyword and/or graphical icon "w", in the set of labeled keywords and/or graphical icons, is associated with a pre-specified label "l". For example, in Table 1, the keyword, such as "query", is associated with the pre-specified label, such as "positive", twice. Therefore, freq(query, positive)=2;

freq(w) represents a number of times the keyword and/or graphical icon "w" appears in the set of labeled keywords and/or graphical icons. For example, in Table 1, the keyword, such as "query", appears thrice in the set of labeled keywords and/or graphical icons. Therefore, freq(query)=3;

freq(l) represents a number of times the pre-specified label "l" appears in the set of labeled keywords and/or graphical icons. For example, with reference to Table 1, the pre-specified label, such as "positive", appears five times in the set of labeled keywords and/or graphical icons. Therefore, freq(positive)=5; and AP(w,l) represents the strength of association parameter for the keyword and/or graphical icon "w" and the pre-specified label "l".

After the determination of the strength of the association parameter, in an embodiment, the content processor 208 may be configured to identify a subset of labeled keywords and/or graphical icons from the set of labeled keywords and/or graphical icons. In an embodiment, the subset of labeled keywords and/or graphical icons is identified from the set of labeled keywords and/or graphical icons based on a second pre-specified threshold. The strength of association parameter of each keyword and/or graphical icon in the subset of labeled keywords and/or graphical icons is greater than the second pre-specified threshold, such as "0". For example, Table 3 illustrates the set of labeled keyword and/or graphical icons with corresponding strength of the association parameter.

TABLE 3

Illustration of the strength of the association parameter for each keyword and/or graphical icon in the set of labeled keywords and/or graphical icons

| Keyword/Graphical icon | Pre-specified label | Strength of association parameter |
|---|---|---|
| Hello | Positive | 0.65 |
| Horrible | Negative | 0.58 |
| Query | Positive | 0.45 |
| Welcome | Positive | 0.68 |
| ☺ | Positive | 0.79 |
| ☹ | Negative | 0.72 |
| Upset | Negative | 0.82 |
| Query | Negative | −0.23 |

With reference to Table 3, the content processor 208 may be configured to determine the subset of labeled keywords and/or graphical icons, based on the second pre-specified threshold, such as "0," as illustrated in Table 4.

TABLE 4

Illustration of the subset of labeled keywords and/or graphical icons

| Keyword/Graphical icon | Pre-specified label | Strength of association parameter |
|---|---|---|
| Hello | Positive | 0.65 |
| Horrible | Negative | 0.58 |
| Query | Positive | 0.45 |
| Welcome | Positive | 0.68 |
| ☺ | Positive | 0.79 |
| ☹ | Negative | 0.72 |
| Upset | Negative | 0.82 |

A person having ordinary skill in the art will understand that the abovementioned example for is for illustrative purpose and should not be construed to limit the scope of the disclosure.

Thereafter, the content processor 208 may be configured to identify one or more keywords and/or graphical icons in the current text segment. The content processor 208 may utilize one or more keyword identification techniques known in the art for the identification of the one or more keywords and/or graphical icons. Examples of the one or more keyword extraction techniques may include, but are not limited to, TF-IDF technique and TF-ISF technique. Further, the content processor 208 may be configured to determine a similarity score of each of the identified one or more keywords and/or graphical icons for each labeled keyword and/or graphical icon in the subset of labeled keywords and/or graphical icons. In an embodiment, the content processor 208 may utilize one or more similarity measures known in the art for the determination of the similarity score. Examples of the one or more similarity measures may include, but are not limited to, Cosine similarity, Lavenshtein distance, and Euclidian distance. In an embodiment, if the set of labeled keywords and/or graphical icons is associated with a specific domain, the content processor 208 may determine the similarity score in accordance with the associated domain. For example, for a domain, such as "Mathematics", a keyword, such as "regression", may be determined to be similar to another keyword, such as "statistics". However, the same keyword (i.e., "regression") may not be determined to be similar to the keyword "statistics" for another domain, such as "English."

Based on the determined similarity score, the content processor 208 may associate the pre-specified label, such as "positive" or "negative," with each of the identified one or more keywords and/or graphical icons. For example, in a scenario, the content processor 208 may determine a labeled keyword and/or graphical icon in the subset of labeled keywords and/or graphical icons that has the highest similarity score with a keyword and/or graphical icon in the identified one or more keywords and/or graphical icons. In another scenario, the content processor 208 may determine a labeled keyword and/or graphical icon in the subset of labeled keywords and/or graphical icons that has a similarity score greater than a similarity threshold with a keyword and/or graphical icon in the identified one or more keywords and/or graphical icons. Thereafter, the content processor 208 may associate the keyword and/or graphical icon with the same pre-specified label and the strength of association parameter as that of the labeled keyword and/or graphical icon with the highest similarity score. Similarly, the content processor 208 may associate each of the identified one or more keywords and/or graphical icons with the pre-specified label, such as "positive" or "negative." Further, the identified one or more keywords and/or graphical icons that are associated with the pre-specified label "positive" are collectively referred to as the one or more positive keywords and/or graphical icons. Furthermore, the identified one or more keywords and/or graphical icons that are associated with the pre-specified label "negative" are collectively referred to as the one or more negative keywords and/or graphical icons.

In an embodiment, the processor 202 may further augment the set of labeled keywords and/or graphical icons with new keywords and/or graphical icons by inserting the one or more positive keywords and/or graphical icons and the one or more negative keywords and/or graphical icons and the corresponding strength of association parameter in the set of labeled keywords and/or graphical icons. Thereafter, the transceiver 206 may be configured to transmit the augmented set of labeled keywords and/or graphical icons to the database server 106 for storage.

A person having ordinary skill in the art will understand that the abovementioned examples are for illustrative purpose and should not be construed to limit the scope of the disclosure.

At step 310, the one or more first features are extracted from the current text segment. In an embodiment, the content processor 208, in conjunction with the processor 202, may be configured to extract the one or more first features from the current text segment. In an embodiment, the one or more first features may correspond to the difference between timestamps associated with each of the current text segment and the previous text segment, the information pertaining to the position of the current text segment in the text content, the count of the one or more keywords in the current text segment, and/or the predetermined category associated with the previous text segment.

In an embodiment, the content processor 208 may be configured to determine the difference between the timestamps associated with the current text segment and the previous text segment. In an embodiment, the previous text segment may be temporally adjacent and prior to the current text segment. Further, the determined difference between the timestamps associated with the current text segment and the previous text segment may correspond to a first feature of the one or more first features. For example, a current text segment, such as "I want to inquire the status of my refund request," may be associated with the timestamp, such as "10:02 AM." Further, a previous text segment (temporally prior to the current text segment), such as "How can I help you?," may be associated with the timestamp, such as "10:00 AM." Thus, the content processor 208 may determine that the difference between the timestamps is "2 seconds."

A person having ordinary skill in the art will understand that the abovementioned example is for illustrative purpose and should not be construed to limit the scope of the disclosure.

In an embodiment, the content processor 208 may be configured to determine the position of the current text segment in the text content. For example, in the text content, such as "User_1: Hi there, thanks for contacting Helpcare. My name is User_1. How can I help you? User_2: I want to inquire the status of my refund request and have been trying to contact somebody from Helpcare for 2 hours," the content processor 208 may determine that the current text segment, such as "I want to inquire the status of my refund request," is at the "5th position."

A person having ordinary skill in the art will understand that the abovementioned example is for illustrative purpose and should not be construed to limit the scope of the disclosure.

In an embodiment, the content processor 208 may be configured to determine the count of one or more keywords in the current text segment. In an embodiment, the content processor 208 may eliminate one or more stop words, such as prepositions, articles, interjections, conjunctions and/or the like, from the current text segment before determining the count of the one or more keywords in the current text segment. For example, in the current text segment, such as "I want to inquire the status of my refund request," the content processor 208 may determine the count of the one or more keywords, such as "want," "inquire," "status," "refund," and "request," is "5."

A person having ordinary skill in the art will understand that the abovementioned example is for illustrative purpose and should not be construed to limit the scope of the disclosure.

In an embodiment, the content processor 208 may be configured to utilize the predetermined category associated with the previous text segment as a first feature of the one or more first features. For example, the previous text segment, such as "How can I help you?," may be associated with the predetermined category, such as "courteous." In this scenario, the content processor 208 may utilize the predetermined category, such as "courteous," as a first feature of the one or more first features for the current text segment, such as "I want to inquire the status of my refund request."

In an embodiment, the one or more first features associated with the current text segment may further comprise the first tag and the second tag associated with the current text segment. For example, the content processor 208 may further utilize the first tag, such as "User_2," and the second tag, such as "PS," associated with the current text segment, such as "I want to inquire the status of my refund request," as the one or more first features for the current text segment.

A person having ordinary skill in the art will understand that the abovementioned example is for illustrative purpose and should not be construed to limit the scope of the disclosure.

At step 312, the one or more second features are extracted from the current text segment. In an embodiment, the processor 202 may be configured to extract the one or more second features from the current text segment. In an embodiment, the one or more second features may correspond to the one or more keywords, in the current text segment, with the frequency of occurrence greater than the first pre-specified threshold and the count of the one or more positive and/or negative keywords and/or graphical icons in the current text segment.

In an embodiment, the content processor 208 may be configured to identify the one or more keywords, in the one or more identified keywords, in the current text segment with the frequency of occurrence greater than the first pre-specified threshold. Further, the content processor 208 may be configured to determine the count of the one or more positive and/or negative keywords and/or graphical icons in the current text segment.

In an embodiment, the content processor 208 may further utilize a count of one or more keywords in the current text segment that are separated by punctuations, such as comma, semicolon, and/or the like, as a second feature of the one or more second features.

At step 314, the current text segment is categorized into the predetermined category of the one or more predetermined categories. In an embodiment, the processor 202 may be configured to categorize the current text segment into the predetermined category of the one or more predetermined categories. In an embodiment, processor 202 may categorize the current text segment into the predetermined category based on the one or more first features and the one or more second features extracted from the current text segment. In an embodiment, the processor 202 may utilize the trained classifier to categorize the current text segment into the predetermined category, automatically. Examples of the one or more predetermined categories may include, but are not limited to, "happy," "assured," "apologetic," "courteous," "agreed," "unhappy," "disagreed," and "no attribute." In an embodiment, a predetermined category of the one or more predetermined categories may be associated with an attribute of the one or more attributes. In an embodiment, the attribute may correspond to an emotion type of one or more emotion types. Examples of the one or more emotion types may include, but are not limited to, "happiness," "assurance," "apology," "courtesy," "agreement," "unhappiness," "disagreement," and "no emotion."

Prior to categorization, the trained classifier may detect the attribute, of the one or more attributes, that is associated with the current segment. In an embodiment, the classifier may utilize the one or more first features and the one or more second features extracted from the current segment for the detection of the attribute.

In an exemplary scenario, the trained classifier may utilize the extracted one or more first features and the one or more second features from the current text segment, such as "I want to inquire the status of my refund request." Further, based on the extracted one or more first features and the one or more second features the trained classifier may detect "no emotion" as the attribute for the current text segment.

In another exemplary scenario, the trained classifier may utilize the extracted one or more first features and the extracted one or more second features from the current text segment, such as "have been trying to contact somebody from Helpcare for 2 hours." Further, based on the extracted one or more first features and the extracted one or more second features the trained classifier may detect "unhappiness" as the attribute for the current text segment.

A person having ordinary skill in the art will understand that the abovementioned exemplary scenarios are for illustrative purpose and should not be construed to limit the scope of the disclosure.

An embodiment of a method for training the classifier has be described later in FIG. 4.

In an embodiment, the trained classifier may determine a probability score of the association of the current text segment with each of the one or more attributes. Further, the content processor 208 may detect an attribute of the one or more attributes that has a maximum probability score for the association with the current text segment. For example, the trained classifier may determine a probability score, such as "0.34," of the association of the current text segment, such as "How can I help you," with a first attribute, such as "happiness." The trained classifier may further determine that the probability score for the association of the current text segment with a second attribute, such as "courtesy" is "0.66." Thereafter, the content processor 208 may detect the attribute "courtesy" for the current text segment based on the probability score.

After the detection, the trained classifier may categorize the current segment into the predetermined category that is associated with the detected attribute. For example, the trained classifier may categorize the current text segment, such as "How can I help you," associated with a first attribute, such as "happiness," into a predetermined category, such as "happy," which is associated with the detected attribute "happiness."

A person having ordinary skill in the art will understand that the scope of step 308 to step 314 is not limited to categorizing the current text segment into a predetermined category. In an embodiment, the content processor 208 may categorize each of the one or more text segments based on the corresponding one or more first features and the corresponding one or more second features into the one or more predetermined categories.

At step 316, the likelihood of the evolution of the attribute in the text content is predicted, based on the predetermined category associated with the current text segment. In an embodiment, the prediction unit 210, in conjunction with the processor 202, may be configured to predict the likelihood of the evolution of the attribute in the text content, based on the predetermined category associated with the current text segment.

In an embodiment, the prediction unit 210 may utilize the determined probability score associated with each of the one or more text segments in the text content for the prediction of the likelihood of the evolution of the attribute in the text content. In an embodiment, the prediction unit 210 may utilize the determined probability score for the association of each of the one or more text segments with an attribute, of the one or more attributes, to predict the evolution of the attribute in the text content. In an embodiment, the likelihood of evolution of the attribute may correspond to a cumulative sum of the determined probability score for the association of each of the one or more text segments with the attribute. Similarly, the prediction unit 210 may predict the evolution of the attribute in the text content corresponding to each of the attributes. In an embodiment, the predicted likelihood is presented as the graphical item on the display screen of the requestor-computing device 108 associated with the service provider, who transmitted the request.

In an exemplary scenario, the trained classifier may determine the probability scores, such as "0.22," "0.34," "0.45," "0.53," and "0.56," of the association of each of the one or more text segments in the text content with an attribute (i.e., an emotion type), such as "happiness," of the one or more attributes. Thereafter, the prediction unit 210 may determine the cumulative sum of the determined probability scores to predict the evolution of the attribute "happiness" in the text content. Control passes to the end step 318.

Figure 4:
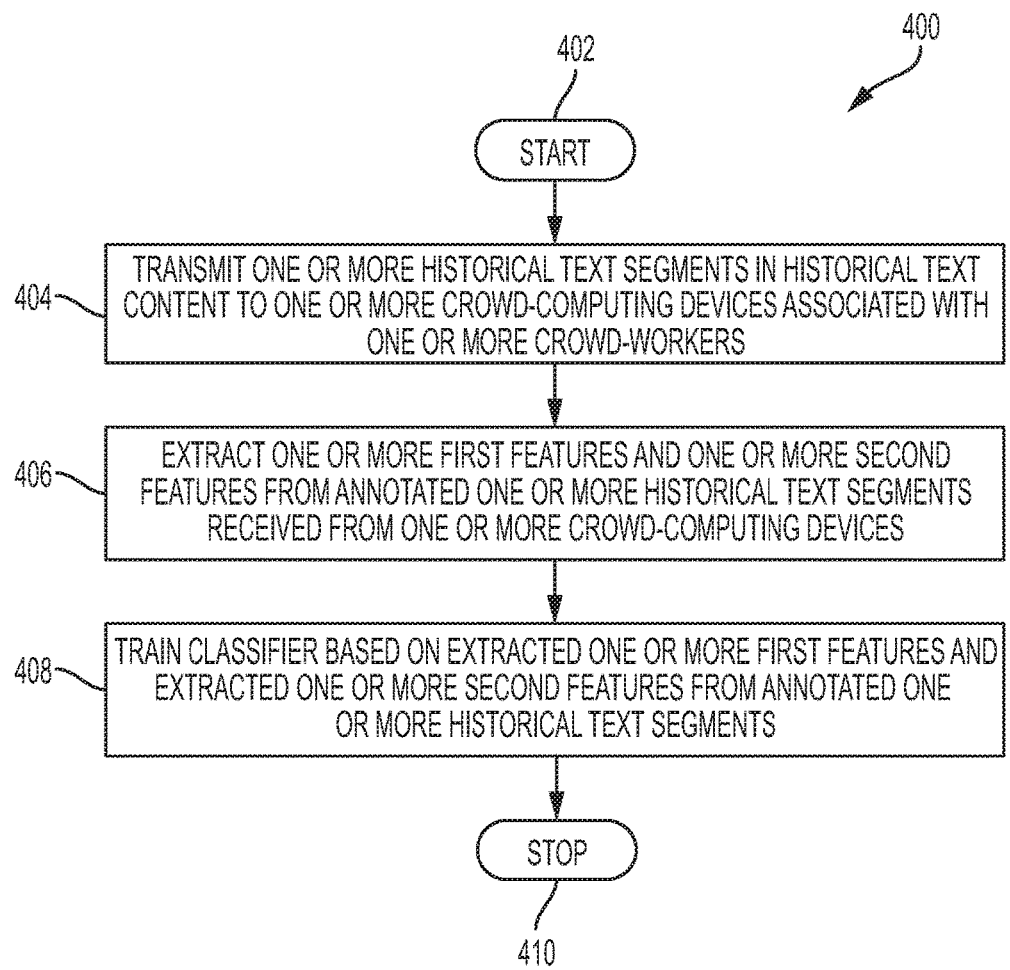
FIG. 4 is a flowchart that illustrates a method for training a classifier for real-time text analysis, in accordance with at least one embodiment.

FIG. 4 depicts a flowchart that illustrates a method for training a classifier for real-time text analysis, in accordance with at least one embodiment. FIG. 4 is described in conjunction with FIG. 1, FIG. 2, and FIG. 3. With reference to FIG. 4, there is shown a flowchart 400 that illustrates a method for training the classifier for real-time text analysis. A person having ordinary skill in the art will understand that the examples, as described in FIG. 4, are for illustrative purpose and should not be construed limiting to the scope of the disclosure. The method starts at step 402 and proceeds to step 404.

At step 404, the one or more historical text segments in the historical text content are transmitted to one or more crowd-computing devices associated with one or more crowd-workers. In an embodiment, the transceiver 206, in conjunction with the processor 202, may be configured to transmit the one or more historical text segments in the historical text content to the one or more crowd-computing devices associated with the one or more crowd-workers.

Prior to the transmission of the one or more historical text segments to the one or more crowd-computing devices, in an embodiment, the transceiver 206 may query the database server 106 for the retrieval of the historical text content. In another embodiment, the transceiver 206 may retrieve the historical text content from the content repository of the service agency, such as a call center.

In an embodiment, the processor 202 may be configured to present a task to the one or more crowd-workers for annotation of each of the one or more historical text segments with a predetermined category of the one or more predetermined categories. In an embodiment, the one or more crowd-workers may annotate each of the one or more historical text segments, based on the association of each of the one or more historical text segments with the one or more attributes. The application server 104 may utilize one or more crowd-sourcing platforms known in the art for presenting the task to the one or more crowd-workers. Examples of the one or more crowd-sourcing platforms may include, but are not limited to, Amazon Mechanical Turk® and Crowd Flower®.

At step 406, the one or more first features and the one or more second features are extracted from the annotated one or more historical text segments received from the one or more crowd-computing devices. In an embodiment, the content processor 208, in conjunction with the processor 202, may be configured to extract the one or more first features and the one or more second features from the annotated one or more historical text segments. An embodiment of the extraction of the one or more first features and the one or more second features has been explained in FIG. 3.

Prior to the extraction of the one or more first features and the one or more second features, the processor 202 may be configured to cluster the annotated one or more historical text segments into one or more clusters, based on the predetermined category associated with each of the annotated one or more historical text segments. Further, each cluster of the one or more clusters comprises the one or more historical text segments that are annotated with same predetermined category. For example, the one or more historical text segments that are annotated with a predetermined category, such as "happy," may be grouped under a first cluster and the one or more historical text segments that are annotated with a predetermined category, such as "unhappy," may be grouped under a second cluster.

After clustering the annotated one or more historical text segments, the content processor 208 may be configured to extract the one or more first features and the one or more second features from the annotated one or more historical text segments in each of the one or more clusters.

At step 408, the classifier is trained based on the extracted one or more first features and the extracted one or more second features from the annotated one or more historical text segments. In an embodiment, the processor 202 may be configured to train the classifier, based on the extracted one or more first features and the extracted one or more second features. In an embodiment, the processor 202 may utilize one or more statistical models, such as a conditional random field (CRF) model, for training the classifier.

In an exemplary scenario, the processor 202 may utilize the one or more first features and the one or more second features extracted from the annotated one or more historical segments in the first cluster to train the classifier to detect the attribute associated with the predetermined category associated with the first cluster (i.e., "happy"). Further, the processor 202 may utilize the one or more first features and the one or more second features extracted from the annotated one or more historical segments in the second cluster to train the classifier to detect the attribute associated with the predetermined category associated with the second cluster (i.e., "unhappy"). Similarly, the processor 202 may train the classifier to detect each of the one or more attributes associated with each of the one or more predetermined categories.

A person having ordinary skill in the art will understand that the abovementioned exemplary scenario is for illustrative purpose and should not be construed to limit the scope of the disclosure.

Control passes to the end step 410.

Figure 5:
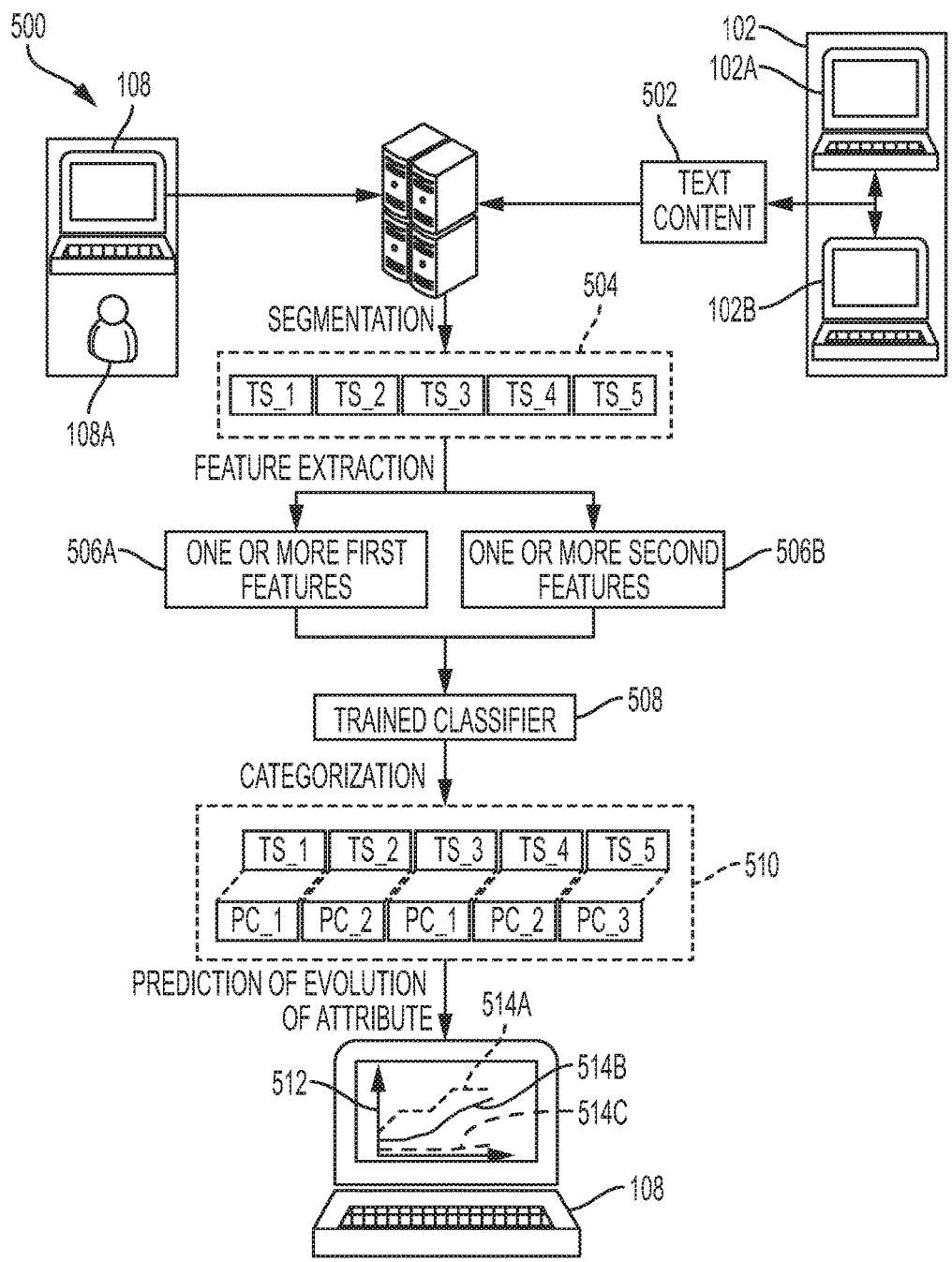
FIG. 5 is a block diagram that illustrates an exemplary scenario for real-time text analysis, in accordance with at least one embodiment.

FIG. 5 is a block diagram that illustrates an exemplary scenario for real-time text analysis, in accordance with at least one embodiment. FIG. 5 has been explained in conjunction with FIGS. 1-4. With reference to FIG. 5, there is shown an exemplary scenario 500 for real-time text analysis.

With reference to FIG. 5, there is shown a requestor-computing device 108 associated with a service provider 108A, such as a call center operator. The service provider 108A may utilize the requestor-computing device 108 to transmit a request, to the application server 104, for real-time text analysis of an ongoing conversation (i.e., communication) between the plurality of users, such as a customer care agent and a customer. The plurality of users may be communicating with each other by utilizing the plurality of user-computing devices 102, such as the user-computing devices 102A and 102B, over the communication network 110. Thereafter, based on the received request the application server 104 may be configured to receive text content 502, generated by the plurality of users, from the plurality of user-computing devices 102.

After receiving the text content 502, the application server 104 may be configured to process the text content 502 for real-time text analysis. In an embodiment, the application server 104 may segment the text content 502 into one or more text segments 504. Further, the application server 104 may extract one or more first features 506A and one or more second features 506B from each of the one or more text segments 504. Thereafter, the application server 104 may utilize a trained classifier 508 for real-time text analysis. The trained classifier 508 may categorize the one or more text segments 504 into one or more predetermined categories, such as "PC_1," "PC_2," and "PC_3."

The trained classifier 508 may utilize the extracted one or more first features 506A and the extracted one or more second features 506B to detect the attribute associated with each of the one or more text segments 504. Thereafter, the trained classifier 508 may be configured to categorize each of the one or more text segments 504 into the one or more predetermined categories, such as "PC_1," "PC_2," and "PC_3," based on the corresponding detected attribute to generate the categorized one or more text segments 510.

The trained classifier 508 may further determine the probability score for the association of each of the one or more text segments 504 with each of the one or more attributes associated with the corresponding one or more predetermined categories, such as "PC_1," "PC_2," and "PC_3." Thereafter, the application server 104 may utilize the determined probability score for predicting the likelihood of evolution of the attribute in the text content 502. Further, the application server 104 may present the predicted likelihood as a graphical item 512 on a display screen of the requestor-computing device 108. The graphical item 512 represents the evolution of the attribute based on curves, such as 514A, 514B, and 514C, for each of the one or more attributes associated with the corresponding one or more predetermined categories, such as "PC_1," "PC_2," and "PC_3," respectively.

A person having ordinary skill in the art will understand that the scope of the abovementioned exemplary scenario is for illustrative purpose and should not be construed to limit the scope of the disclosure.

The disclosed embodiments encompass numerous advantages. The disclosure provides a method and a system of data processing for real-time text analysis. The disclosed method and system utilize a trained classifier for automatic text analysis. Further, the classifier is trained based on one or more first features and one or more second features extracted from annotated historical text content. Besides the content-based features, such as keywords, positive and/or negative keywords and/or graphical icons, the disclosed method and system utilize sequential information extracted from the text content for the analysis of the text content. The sequential information may comprise a difference between timestamps associated with each of a current text segment and a previous text segment in the text content and a position of the current text segment in the text content. Further, the disclosed method and system utilize the detected attribute (e.g., an emotion type) to predict a likelihood of evolution of the attribute in the text content. The likelihood of evolution of the attribute in the text content (i.e., associated with communication between a plurality of users) may be utilized to analyze the communication experience of the entities (i.e., the plurality of users) involved in the communication. The disclosed method and system may be utilized by any service provider agency, such as a call center.

The disclosed method and system, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for data processing for real-time text analysis have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method of data processing for real-time text analysis of an ongoing communication between a plurality of user-computing devices associated with a plurality of users communicating with each other over a communication network, the method comprising:
   receiving, by one or more transceivers, a request from a call center for real-time text analysis of the ongoing communication between the plurality of user-computing devices associated with the plurality of users communicating with each other over the communication network;
   receiving, by the one or more transceivers, text content from the plurality of user-computing devices associated with the plurality of users communicating with each other over the communication network;
   segmenting, by one or more processors, the text content into a plurality of text segments including a plurality of current text segments of the ongoing communication and a plurality of previous text segments of the ongoing communication that are temporally adjacent and prior to the current text segments;
   extracting, by the one or more processors, one or more first features from the current text segments, wherein at least a first feature of the one or more first features corresponds to a difference between timestamps associated with each of the current text segments and the previous text segments;
   categorizing, by the one or more processors, the current text segments into one or more predetermined categories, based on at least the one or more first features, automatically by utilizing a classifier, wherein the classifier is trained based on one or more first features extracted from annotated one or more historical text segments in historical text content, wherein each of the predetermined categories is associated with an attribute associated with a plurality of current text segments;
   predicting, by the one or more processors, a likelihood of evolution of each attribute, based on a predetermined category, the likelihood of evolution of each attribute representing a quality of experience for one of the users of the ongoing communication, wherein predicting the likelihood of evolution of each attribute includes determining a plurality of probability scores for associations of the current text segments with each attribute and determining a cumulative sum of the determined probability scores;
   transmitting, by the one or more transceivers, the predicted likelihood of evolution of each attribute to the call center; and
   displaying, by the one or more processors, the predicted likelihood of evolution of each attribute as a graphical item on a display screen of the call center, thereby enabling the call center to use the predicted likelihood of evolution of each attribute presented as the graphical item to determine whether a user is satisfied with a service.

2. The method of claim 1, wherein the one or more historical text segments in the historical text content are transmitted to one or more crowd-computing devices associated with one or more crowd-workers, wherein the one or more crowd-workers are presented a task to annotate each of the one or more historical text segments with the one or more predetermined categories.

3. The method of claim 2, further comprising extracting, by the one or more processors, one or more second features from the annotated one or more historical text segments received from the one or more crowd-computing devices, wherein the extracted one or more second features from the annotated one or more historical text segments are utilized for the training of the classifier.

4. The method of claim 1, wherein each attribute corresponds to an emotion type associated with the current text segments.

5. The method of claim 1, wherein segmenting, by the one or more processors, the text content into a plurality of text segments is performed based one or more sentence boundary detection algorithms.

6. The method of claim 1, wherein the one or more first features from the current text segments further comprise information pertaining to a position of the current text segments in the text content, a count of one or more keywords in the current text segments, and a predetermined category associated with the previous text segments.

7. The method of claim 6, further comprising identifying one or more positive keywords, negative keywords, or graphical icons from one or more keywords or graphical icons in the current text segments, based on a set of labeled keywords or graphical icons, wherein each labeled keyword or graphical icon in the set of labeled keywords or graphical icons is associated with a pre-specified label.

8. The method of claim 7, further comprising determining, by the one or more processors, strength of an association parameter for each labeled keyword or graphical icon in the set of labeled keywords or graphical icons, based on an association of each labeled keyword or graphical icon in the set of labeled keywords or graphical icons with the corresponding pre-specified label.

9. The method of claim 7, further comprising extracting, by the one or more processors, one or more second features from the current text segments, wherein the one or more second features comprise one or more keywords, in the current text segments, with a frequency of occurrence greater than a pre-specified threshold and a count of the one or more positive keywords, negative keywords, or graphical icons in the current text segments.

10. The method of claim 9, wherein the predetermined categories associated with the current text segments are further detected, automatically by utilizing the classifier, based on the extracted one or more second features from the current text segments.

11. A system for data processing for real-time text analysis of an ongoing communication between a plurality of user-computing devices associated with a plurality of users communicating with each other over a communication network, the system comprising:
   one or more transceivers configured to receive a request from a call center for real-time text analysis of the ongoing communication between the plurality of user-computing devices associated with the plurality of users communicating with each other over the communication network; and
   one or more processors configured to:
      receive text content, using the one or more transceivers, from the plurality of user-computing devices associated with the plurality of users communicating with each other over the communication network;
      segment the text content into a plurality of text segments including a plurality of current text segments of the ongoing communication and a plurality of previous text segments of the ongoing communication that are temporally adjacent and prior to the current text segments;

extract one or more first features from the current text segments, wherein at least a first feature of the one or more first features corresponds to a difference between timestamps associated with each of the current text segments and the previous text segments;

categorize the current text segments into one or more predetermined categories, based on at least the one or more first features, automatically by utilizing a classifier, wherein the classifier is trained based on one or more first features extracted from annotated one or more historical text segments in historical text content, wherein each of the predetermined categories is associated with an attribute associated with a plurality of current text segments;

predict a likelihood of evolution of each attribute, based on a predetermined category, the likelihood of evolution of each attribute representing a quality of experience for one of the users of the ongoing communication, wherein predicting the likelihood of evolution of each attribute includes determining a plurality of probability scores for associations of the current text segments with each attribute and determining a cumulative sum of the determined probability scores;

transmit, using the one or more transceivers, the predicted likelihood of evolution of each attribute to the call center; and display the predicted likelihood of evolution of each attribute as a graphical item on a display screen of the call center, thereby enabling the call center to use the predicted likelihood of evolution of each attribute presented as the graphical item to determine whether a user is satisfied with a service.

12. The system of claim 11, wherein the one or more historical text segments in the historical text content are transmitted to one or more crowd-computing devices associated with one or more crowd-workers, wherein the one or more crowd-workers are presented a task to annotate each of the one or more historical text segments with the predetermined categories.

13. The system of claim 12, wherein the one or more processors are further configured to extract one or more second features from the annotated one or more historical text segments received from the one or more crowd-computing devices, wherein the extracted one or more second features from the annotated one or more historical text segments are utilized for the training of the classifier.

14. The system of claim 13, wherein each attribute corresponds to an emotion type associated with the current text segments.

15. The system of claim 11, wherein the one or more processors are further configured to segment the text content into the plurality of text segments based one or more sentence boundary detection algorithms.

16. The system of claim 11, wherein the one or more first features from the current text segments further comprise information pertaining to a position of the current text segments in the text content, a count of one or more keywords in the current text segments, and a predetermined category associated with the previous text segments.

17. The system of claim 11, wherein the one or more processors are further configured to:

identify one or more positive keywords, negative keywords, or graphical icons from one or more keywords or graphical icons in the current text segments, based on a set of labeled keywords or graphical icons, wherein each labeled keyword or graphical icon in the set of labeled keywords or graphical icons is associated with a pre-specified label; and determine strength of an association parameter for each labeled keyword or graphical icon in the set of labeled keywords or graphical icons, based on an association of each labeled keyword or graphical icon in the set of labeled keywords or graphical icons with the corresponding pre-specified label.

18. The system of claim 11, wherein the one or more processors are further configured to extract one or more second features from the current text segments, wherein the one or more second features comprise one or more keywords, in the current text segments, with a frequency of occurrence greater than a pre-specified threshold and a count of one or more positive keywords, negative keywords, or graphical icons in the current text segments.

19. The system of claim 18, wherein the predetermined categories associated with the current text segments are further detected, automatically by utilizing the classifier, based on the extracted one or more second features from the current text segments.

20. A computer program product for use with a computer, the computer program product comprising a non-transitory computer readable medium, wherein the non-transitory computer readable medium stores a computer program code for data processing for real-time text analysis of an ongoing communication between a plurality of user-computing devices associated with a plurality of users communicating with each other over a communication network, wherein the computer program code is executable by one or more processors to:

receiving, by one or more transceivers, a request from a call center for real-time text analysis of the ongoing communication between the plurality of user-computing devices associated with the plurality of users communicating with each other over the communication network;

receive text content, by the one or more transceivers, from the plurality of user-computing devices associated with the plurality of users communicating with each other over the communication network;

segmenting, by one or more processors, the text content into a plurality of text segments including a plurality of current text segments of the ongoing communication and a plurality of previous text segments of the ongoing communication that are temporally adjacent and prior to the current text segments;

extract, by the one or more processors, one or more first features from the current text segments, wherein at least a first feature of the one or more first features corresponds to a difference between timestamps associated with each of the current text segments and the previous text segments;

categorize, by the one or more processors, the current text segments into one or more predetermined categories, based on at least the one or more first features, automatically by utilizing a classifier, wherein the classifier is trained based on one or more first features extracted from annotated one or more historical text segments in historical text content, wherein each of the predetermined categories is associated with an attribute associated with a plurality of current text segments;

predict, by the one or more processors, a likelihood of evolution of each attribute, based on a predetermined category, the likelihood of evolution of each attribute representing a quality of experience for one of the users of the ongoing communication, wherein predicting the likelihood of evolution of each attribute includes determining a plurality of probability scores for associations of the current text segments with each attribute and determining a cumulative sum of the determined probability scores;

transmitting, by the one or more transceivers, the predicted likelihood of evolution of each attribute to the call center; and displaying, by the one or more processors, the predicted likelihood of evolution of each attribute as a graphical item on a display screen of the call center, thereby enabling the call center to use the predicted likelihood of evolution of each attribute presented as the graphical item to determine whether a user is satisfied with a service.

* * * * *